United States Patent
Dyson et al.

(10) Patent No.: US 7,126,742 B2
(45) Date of Patent: Oct. 24, 2006

(54) ELECTROSTATIC CONTROL OF A MEMBRANE FOR ADAPTIVE OPTICS AND THE LIKE

(75) Inventors: Harold M. Dyson, Beith (GB); Peter Kurczynski, South Orange, NJ (US); John A. Tyson, Winters, CA (US)

(73) Assignees: Lucent Technologies Inc., Murray Hill, NJ (US); University of California, Oakland, CA (US)

( * ) Notice: Subject to any disclaimer, the term of this patent is extended or adjusted under 35 U.S.C. 154(b) by 118 days.

(21) Appl. No.: 11/024,373

(22) Filed: Dec. 23, 2004

(65) Prior Publication Data

US 2006/0139728 A1    Jun. 29, 2006

(51) Int. Cl.
*G02B 26/00* (2006.01)
*G02B 5/08* (2006.01)

(52) U.S. Cl. ............... 359/295; 359/846; 359/847

(58) Field of Classification Search ........... 348/770, 348/771; 359/223, 290, 291, 295, 846, 847
See application file for complete search history.

(56) References Cited

U.S. PATENT DOCUMENTS 6,639,710 B1    10/2003    Kurczynski et al. ........ 359/290

*Primary Examiner*—David N. Spector

(57) ABSTRACT

A membrane receives an incident energy signal at a first surface of the membrane. An actuating electrode, located adjacent to the membrane on a side opposite the first surface, applies an actuating pressure to the membrane if an actuating potential is applied between the actuating electrode and the membrane. A restoring electrode, located adjacent to the first surface of the membrane, applies a restoring pressure to the membrane if a restoring potential is applied between the restoring electrode and the membrane. The restoring electrode has an outer surface defining an aperture that enables the incident energy signal to pass, for example, without significant obstruction and without significant attenuation, through the restoring electrode to impinge upon the membrane, and the length of the restoring electrode is at least as great as the smallest width of the aperture.

20 Claims, 1 Drawing Sheet

ELECTROSTATIC CONTROL OF A MEMBRANE FOR ADAPTIVE OPTICS AND THE LIKE

CROSS-REFERENCE TO RELATED APPLICATIONS

The subject matter of this application is related to the subject matter of U.S. Pat. No. 6,639,710, the teachings of which are incorporated herein by reference.

BACKGROUND OF THE INVENTION

1. Field of the Invention

The invention relates to membrane control, and, in particular, to an electrode configuration for electrostatically controlling the shape of a membrane used in adaptive optics to correct distortion of optical signals.

2. Description of the Related Art

Membranes, such as optical membranes, can serve as mirrors, light gathering and focusing devices, etc. A membrane whose surface can be deformed may serve as an adjustable mirror, which may be useful for such applications as focusing, and for correcting aberrations that may occur as a result of, e.g., light passing through atmosphere, the latter of which may be problematic in astronomical observations using a telescope.

A membrane device may employ one or more actuators to change the shape of the membrane surface. A membrane device that can be selectively actuated in opposing directions to effect a deformation of the membrane surface first via a deforming force, and then via an opposing, restoring force to restore the original shape of the membrane, is highly desirable for use as an adaptive optical element.

Traditional membrane devices operate via electrostatic attraction of the membrane surface to one or more electrodes located beneath the membrane. Due to the lack of an opposing upward electrostatic restoring force, these devices have limited capability.

Some membrane devices, such as those described in U.S. Pat. No. 6,639,710, implement such a restoring force by a transparent bias electrode, which is placed in the optical path above the membrane. These devices may suffer from loss of optical power due to absorption or scattering by the bias electrode, which is typically transparent for only a limited range of wavelengths. U.S. Pat. No. 6,639,710 also suggests using a circular electrode ring for the restoring electrode, but such a ring will not provide a sufficiently uniform electric field over the area of the membrane.

SUMMARY OF THE INVENTION

Problems in the prior art are addressed in accordance with the principles of the invention by applying a restoring force to a membrane using an electrode having an outer surface defining an aperture from one end of the electrode to the other, wherein the length of the electrode is at least as great as the smallest width of the aperture, and the aperture permits light to pass, for example, without significant obstruction and without significant attenuation, through the electrode. Application of an electrical potential to the electrode with respect to the membrane causes a restoring pressure (i.e., attractive force) to be exerted on the membrane towards the electrode. Although the electrode may have a circular cylindrical shape, other shapes are possible.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

Figure 1:
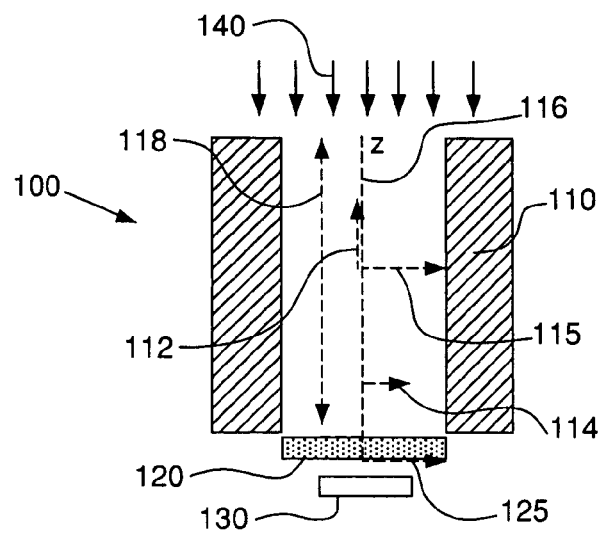
FIGS. 1(a) and (b) show cross-sectional side and top views of an adaptive mirror system, according to one embodiment of the present invention.
Figure 1:
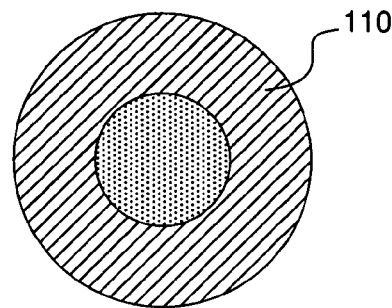

FIG. 1 depicts an adaptive mirror system 100. System 100 includes restoring electrode 110, membrane 120, and actuating electrode array 130. The shape of electrode 110 has a cylindrical outer surface that defines an aperture from one end of the electrode to the other. Electrode 110 may be charged to a voltage V (voltage and electrical potential are used interchangeably herein) with respect to membrane 120, which is optically reflective, electrically conductive, and typically electrically grounded. Radius 115 of electrode 110 is at least as large as radius 125 of circular membrane 120. According to certain embodiments of the invention, the restoring electrode's smallest inner dimension exceeds the widest dimension of the membrane in order to increase the amount of light incident to the membrane. Optic axis 116 defines an orientation that incident light 140 may travel within electrode 110 and impinge on membrane 120. Due to the electrode geometry, the incident light is substantially unaffected in magnitude or direction by the presence of electrode 110.

As a result of the voltage V of electrode 110, an electrostatic potential $\Phi(\rho,z)$ within electrode 110 may be calculated by solving the Laplace equation, the axially symmetric solution (appropriate for a circular cylindrical electrode) being given by Equation (1) as follows:

$$\Phi(\rho, z) = \sum_{n=1,3,5,\ldots}^{\infty} \left( \frac{4V}{n\pi} \frac{I_0(k_z\rho)}{I_0(k_z b)} \sin(k_z z) \right), \quad (1)$$

where $k_z = n\pi/L$, L is the cylinder length 118, $\rho$ is a radial distance from electrode axis 116 (same as optic axis 116), z is a vertical distance along electrode axis 116, where z=0 at the end of the cylinder closest to membrane 120, b is the cylinder radius 115, and $I_0$ is a modified Bessel function of order zero. Electric field E may be found by calculating its components $E_\rho = -\partial\Phi/\partial\rho$ and $E_z = -\partial\Phi/\partial z$. Due to the cylindrical symmetry, there is no angular component $E_\theta$ of the electrical field.

As a result of the applied voltage V to electrode 110, membrane 120 experiences an electrostatic pressure P having a vertical component $P_z$ (also called restoring pressure herein) and a radial component $P_\rho$. Membrane 120 may have been deformed by an actuating pressure exerted by actuating electrode array 130, which is an array of one or more individually controllable actuating electrodes, each charged to a corresponding potential with respect to membrane 120. The vertical component $P_z$ of electrostatic pressure P exerted on membrane 120 due to the voltage V of electrode 110 with respect to membrane 120, then serves as a restoring pressure $P_z$ on membrane 120, and is given by Equation (2) as follows:

$$P_z = \frac{1}{2}\varepsilon_0 E_z^2, \quad (2)$$

where:

$$E_z(\rho, z) = -\sum_{n=1,3,5,\ldots}^{\infty} \left(\frac{4V}{L} \frac{I_0(k_z\rho)}{I_0(k_z b)} \sin(k_z z)\right).$$

Because the restoring pressure $P_z$ is proportional to the square of the z-component of the electric field, the sense of the restoring pressure $P_z$ is independent of the sign of the applied voltage V. Hence, in order to produce a restoring pressure, electrode 110 is situated on a side of membrane 120 opposite that of actuating electrode array 130, i.e., membrane 120 lies between actuating electrode array 130 and restoring electrode 110. The voltage V may be adjusted so that the restoring pressure balances the actuating pressure, which results in the membrane returning to its original (e.g., undeformed) shape. Furthermore, if membrane 120 does not automatically return to its original shape when the actuating pressure is turned off, then electrode 110 can be used to apply restoring pressure to return the membrane to its original shape.

The embodiment of FIG. 1 may be used as part of a microelectromechanical system (MEMS) device controlling the deformation of a conducting membrane. Restoring pressures appropriate for use in such a MEMS device may be on the order of 100 Pa. In one exemplary implementation, in order to produce a restoring pressure of 100 Pa at the edge of a circular membrane of radius 2.5 mm, a cylindrical bias electrode of length L=100 mm and radius=5.0 mm would need to be at an operating voltage V of about 16 kV. Since $E_z$ varies linearly with V, and since the restoring pressure $P_z$ varies with the square of $E_z$, for a given radius on the membrane, the restoring pressure $P_z$ varies with the square of the bias voltage V.

Figure 2:
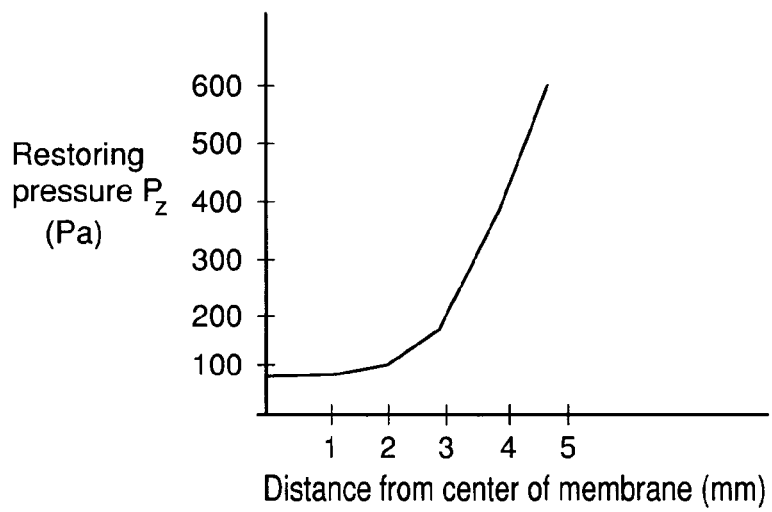
FIG. 2 shows a graph of vertical component $P_z$ of electrostatic pressure vs. distance from the center of the membrane, for the system of FIG. 1.

The variation of restoring pressure across the surface of the membrane for this exemplary implementation is shown in the graph of FIG. 2. It may be seen from FIG. 2 that, for this embodiment of the invention, greater uniformity of restoring pressure is near the center of the membrane. Hence, to achieve sufficient uniformity in restoring pressure on the membrane, it is preferable that the smallest lateral dimension of the aperture (i.e., the diameter for a circular aperture) be greater than the largest lateral dimension of the membrane (i.e., the diameter for a circular membrane).

In another embodiment utilizing the apparatus of FIG. 1, voltage applied may be varied in time, resulting in modulation of incident light that is reflected from the membrane.

According to other embodiments of the present invention, cross-sectional shapes of a cylindrical restoring electrode include shapes other than circles, such as, but not limited to, hexagons, ellipses, and triangles. These shapes may prove advantageous for, e.g., close-packing a plurality of membrane-controlling devices for use in a telescope. These shapes may also prove advantageous where the membrane itself is, e.g., hexagonal, elliptical, or triangular in shape.

In yet another embodiment of the present invention, a restoring electrode is frustum-shaped, with the upper end having an inside radius that is smaller than the inside radius of the lower end (i.e., the end adjacent to the membrane). The geometrical shape of the electrode according to this embodiment permits a portion of incident light that passes through the upper end of the electrode to impinge on a membrane situated adjacent the lower end of the electrode, that portion of the incident light passing through being substantially unaffected in magnitude or direction by the presence of the restoring electrode.

Figure 3:
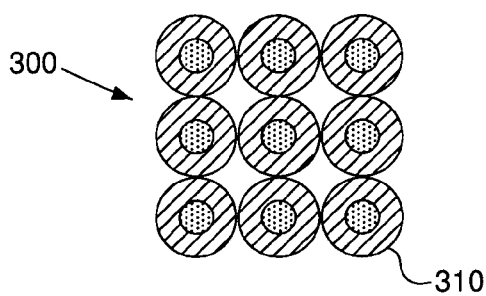
FIGS. 3(a) and (b) show top and cross-sectional side views of a device containing a plurality of instances of the system of FIG. 1, according to another embodiment of the present invention.
Figure 3:
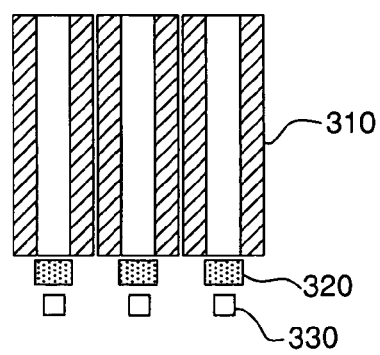

FIGS. 3 depicts an adaptive mirror system 300. System 300 includes an array of restoring electrodes 310, a plurality of corresponding membranes 320, and a plurality of corresponding actuating electrode arrays 330, according to another embodiment of the present invention. A membrane 320 may be deflected by a corresponding actuating electrode array 330. Each restoring electrode 310, charged to a respective bias voltage with respect to its corresponding membrane 320, may provide a respective restoring pressure, reversing the effect of a respective actuating pressure that may be produced by corresponding actuating electrode array 330. This embodiment may be advantageous for, e.g., telescopes, where a large optical membrane area can capture sufficient light from a faint optical source. An alternative embodiment of the present invention may utilize an array of restoring electrodes with, e.g., hexagonal cross-section, providing for efficient close-packing of the restoring electrodes.

Although the present invention is described in the context of a restoring electrode formed from a single, solid part defining the aperture through the electrode, in alternative embodiments, the restoring electrode may be formed from two or more parts and/or have an outer surface with one or more openings in addition to the two top and bottom openings that define the aperture.

Although the present invention has been described in the context of embodiments in which the restoring electrode has an unobstructed aperture through which light may pass without significant obstruction and without significant attenuation, the invention is not so limited. For example, in other embodiments, the aperture may have one or more optical filters, such as color filters, polarizing filters, or even optical attenuators, that modify in some way the light or at least some portion of the light that passes through the aperture.

In all of the above embodiments, other forms of energy including, but not limited to, electromagnetic waves (e.g., microwaves) and acoustic waves, may be incident on an embodiment, which may serve to control a membrane upon which a portion of incident energy impinges. Thus, an embodiment may serve to control a membrane capable of reflecting or detecting other types of energy.

For the purposes of this specification, a MEMS device is a device having two or more parts adapted to move relative to one another, where the motion is based on any suitable interaction or combination of interactions, such as mechanical, thermal, electrical, magnetic, optical, and/or chemical interactions, wherein one or more of the critical mechanical dimensions of the device are in the sub-millimeter to nanometer range. MEMS devices are fabricated using micro- or smaller fabrication techniques (including nano-fabrication techniques) that may include, but are not necessarily limited to: (1) self-assembly techniques employing, e.g., self-assembling monolayers, chemical coatings having high affinity to a desired chemical substance, and production and saturation of dangling chemical bonds and (2) wafer/material processing techniques employing, e.g., lithography, chemical vapor deposition, patterning and selective etching of materials, and treating, shaping, plating, and texturing of surfaces. The scale/size of certain elements in a MEMS device may be such as to permit manifestation of quantum effects. Examples of MEMS devices include, without limitation, NEMS (nano-electromechanical systems) devices, MOEMS (micro-opto-electromechanical systems) devices, micromachines, microsystems, and devices produced using microsystems technology or microsystems integration.

Although the present invention has been described in the context of implementation as MEMS devices, the present invention can in theory be implemented at any scale, including scales larger than micro-scale.

Although the invention has been described above with reference to specific embodiments, persons skilled in the art will understand that various modifications and changes may be made thereto without departing from the broader spirit and scope of the invention as set forth in the appended claims. The foregoing description and drawings are, accordingly, to be regarded in an illustrative rather than a restrictive sense.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

We claim:

1. Apparatus comprising:
 a membrane adapted to receive an incident energy signal at a first surface of the membrane;
 an actuating electrode, located adjacent to the membrane on a side opposite the first surface and adapted to apply an actuating pressure to the membrane if an actuating potential is applied between the actuating electrode and the membrane; and
 a restoring electrode, located adjacent to the first surface of the membrane and adapted to apply a restoring pressure to the membrane if a restoring potential is applied between the restoring electrode and the membrane, wherein:
  the restoring electrode has an outer surface defining an aperture that enables the incident energy signal to pass through the restoring electrode to impinge upon the membrane; and
  a length of the restoring electrode is at least as great as a smallest width of the aperture.

2. The invention of claim 1, wherein:
 the actuating pressure is adapted to change the shape of the membrane; and
 the restoring pressure is adapted to restore the shape of the membrane.

3. The invention of claim 1, wherein:
 the actuating electrode comprises an array of actuating electrode elements; and
 each actuating electrode element is adapted to be individually charged to a selected potential with respect to the membrane.

4. The invention of claim 1, wherein:
 the first surface of the membrane is reflective; and
 the energy signal is light capable of reflecting off the first surface of the membrane.

5. The invention of claim 1, wherein the restoring electrode has a circular cylindrical shape.

6. The invention of claim 1, wherein a smallest lateral dimension of the aperture is greater than a largest lateral dimension of the membrane.

7. The invention of claim 1, comprising a plurality of instances of the membrane, the actuating electrode, and the restoring electrode, configured to form an array of adaptive optical elements.

8. The invention of claim 1, wherein the aperture that enables the incident energy signal to pass without significant obstruction and without significant attenuation through the restoring electrode to impinge upon the membrane.

9. Apparatus comprising:
 (a) means for receiving an incident energy signal at a first surface of said means (a);
 (b) means, located adjacent to said means (a) on a side opposite the first surface, for applying an actuating pressure to said means (a) if an actuating potential is applied between said means (b) and said means (a); and
 (c) means, located adjacent to the first surface of said means (a), for applying a restoring pressure to said means (a) if a restoring potential is applied between said means (c) and said means (a), wherein:
  said means (c) has an outer surface defining an aperture that enables the incident energy signal to pass through said means (c) to impinge upon said means (a); and
  a length of said means (c) is at least as great as a smallest width of the aperture.

10. A method for controlling shape of a membrane, the method comprising:
 applying an actuating potential between the membrane and an actuating electrode located adjacent to the membrane on a side opposite a first surface of the membrane to apply an actuating pressure to the membrane; and
 applying a restoring potential between the membrane and a restoring electrode located adjacent to the first surface of the membrane to apply a restoring pressure to the membrane, wherein:
  the restoring electrode has an outer surface defining an aperture that enables an incident energy signal to pass through the restoring electrode to impinge upon the membrane; and
  a length of the restoring electrode is at least as great as a smallest width of the aperture.

11. The invention of claim 10, wherein:
 the actuating pressure changes the shape of the membrane; and
 the restoring pressure restores the shape of the membrane.

12. The invention of claim 10, wherein:
 the actuating electrode comprises an array of actuating electrode elements; and
 each actuating electrode element is individually charged to a selected potential with respect to the membrane.

13. The invention of claim 10, wherein:
the first surface of the membrane is reflective; and
the energy signal is light that reflects off the first surface of the membrane.

14. The invention of claim 10, wherein the restoring electrode has a circular cylindrical shape.

15. The invention of claim 10, wherein a smallest lateral dimension of the aperture is greater than a largest lateral dimension of the membrane.

16. The invention of claim 10, comprising a plurality of instances of the membrane, the actuating electrode, and the restoring electrode, configured to form an array of adaptive optical elements.

17. The invention of claim 10, wherein the actuating potential and the restoring potential are applied simultaneously.

18. The invention of claim 10, wherein the restoring potential is applied after the actuating potential is removed.

19. The invention of claim 10, wherein the aperture that enables the incident energy signal to pass without significant obstruction and without significant attenuation through the restoring electrode to impinge upon the membrane.

20. Apparatus for controlling shape of a membrane, the apparatus comprising:
means for applying an actuating potential between the membrane and an actuating electrode located adjacent to the membrane on a side opposite a first surface of the membrane to apply an actuating pressure to the membrane; and
means for applying a restoring potential between the membrane and a restoring electrode located adjacent to the first surface of the membrane to apply a restoring pressure to the membrane, wherein:
the restoring electrode has an outer surface defining an aperture that enables an incident energy signal to pass through the restoring electrode to impinge upon the membrane; and
a length of the restoring electrode is at least as great as a smallest width of the aperture.

* * * * *